FIG. 3

INVENTOR
CARL W. JOHNSON
MATHIAS PEDERSEN
BY
Wentworth B Clapham
ATTORNEY

Nov. 21, 1961  C. W. JOHNSON ET AL  3,009,431
DECORATIVE STITCH FORMING MACHINE
Filed Nov. 29, 1957  5 Sheets-Sheet 4

INVENTOR
CARL W. JOHNSON
MATHIAS PEDERSEN
BY Wentworth B. Clapham
ATTORNEY

3,009,431
DECORATIVE STITCH FORMING MACHINE
Carl W. Johnson, Brooklyn, and Mathias Pedersen, Valley Stream, N.Y., assignors to American Machine & Foundry Company, a corporation of New Jersey
Filed Nov. 29, 1957, Ser. No. 699,664
10 Claims. (Cl. 112—171)

This invention relates to the art of stitching, and more particularly to improvements relating to stitching machines and stitching methods for producing novel types and combination of types of decorative stitches simulating hand stitching.

The invention further relates to the novel mechanical method of and apparatus for forming simple running stitches or combinations thereof, and stitches composed of longitudinal and transverse portions such as cross stitches, L stitches, T stitches, and other types and combinations of longitudinal and transverse stitch components in such manner that they cannot be distinguished from actual hand work and which heretofore have not been capable of being produced by machines. In fact, work stitched in accordance with the invention cannot be distinguished from work actually stitched by a skilled seamstress or tailor. This is because, as in hand stitching, a single thread is passed back and forth through the work and disposed therein in a manner closely approximating hand stitching.

The machine which produces the novel type of stitches in accordance with the invention, is basically the same as that disclosed in Johnson Patents 2,368,066 and 2,386,800. However, novel mechanism is provided for so controlling the operation of the work feeding means, needle bars which project a double pointed needle having a single eye between its points through which a thread having a loose and a fixed end passes back and forth through the work and the thread handling mechanisms, that it is possible to produce the novel stitches achieved by the invention.

In the case of a back stitch, the work is given a forward, a lateral and a backward movement in effecting the desired cross stitch. Similarly in forming L stitches and T stitches, the movement of the work relative to the needle and its path of travel is so controlled automatically that the desired result is obtained.

In accordance with the invention, the work feed members and a part of the throat plate are moved selectively or given combined movements in effecting the type or types of stitches it is desired to be formed.

A machine constructed in accordance with the invention also is provided with selective mechanism which makes it possible to adapt it rapidly for forming conventional straight under and over stitches, or for producing a plurality of different types of highly decorative stitches.

It is an object of the invention to provide a novel apparatus for and method of forming novel decorative stitches consisting of simple running stitches of equal or varying length or complex and compound combinations of lateral and straight stitches such for example as cross, L, or T stitches and wherein the stitches so formed are produced from a single continuous length of thread which is disposed in the work in a manner closely simulating hand stitching.

It is a further object of the invention to provide a stitching machine which utilizes a double pointed needle and wherein there is provided a plurality of cams capable of being so selected and used that many types of stitches, ranging from simple over and under running stitches to complex, cross, L, or T stitches, can be formed by the operator.

It is a further object of the invention to provide an improved stitch length - adjusting mechanism and also means for insuring the proper transverse relationship of that portion of each complete stitch relative to the longitudinal portion thereof.

The invention is also characterized by novel means for effecting the rearward displacement of the work relative to the needle, and means for adjusting the stroke of the feed dog in the formation of a back stitch.

The invention also consists in the provision of a novel throat plate which has a fixed front part and a rear movable part and wherein the movable part of the throat plate eliminates danger of needle breakage at all times during the operation of the machine in forming any selected type of stitch.

The invention is also characterized by the provision of novel means for insuring exact centralization of the stitch components in the formation of cross stitches and any derivative type of stitch thereof.

With these and other objects not specifically mentioned in view, the invention consists in certain combinations and constructions which will be hereinafter fully described, and then set forth in the claims hereunto appended.

In the accompanying drawings which form a part of this specification, and in which like characters of reference indicate the same or like parts.

With reference to the drawings, the stitch forming mechanisms embodying the invention are shown in conjunction with an under and over stitch sewing machine, such as illustrated and described in Johnson Patent No. 2,386,800 granted October 16, 1945. The present invention is also shown in conjunction with copending Johnson application of a Special Stitch Forming Machine, Ser. No. 571,731 filed on March 15, 1956, now Patent No. 2,941,485.

It will be understood by those skilled in the art that in the type of machine disclosed and described herein, a needle designated N is grasped alternately by the jaws of suitable chucks mounted in two opposed needle bars 20 and 22 and pushed back and forth through the work or material being stitched. In operation of the machine, one end of the thread is held fixed and the other end is loose. The loose end of the thread is pulled through the work on each alternate movement of the needle bars by a rotating thread puller 24 which is similar in construction and operation to that shown and described in Patent No. 2,386,800, as well as in the above referred to co-pending application Ser. No. 571,731. Needle N, which is projected by needle bars 20 and 22 back and forth through the work, is a double pointed needle having a point at each end and an eye located preferably about midway between the ends thereof through which the thread passes. Since both needle bars 20 and 22 are constructed in the same manner as the needle bars shown and described in Patent 2,386,800, and their construction forms no specific part of the present invention, further detailed disclosure and description thereof are deemed unnecessary and are therefore omitted.

The machine is driven by a suitable pulley through a belt and another suitable pulley with a suitable clutch mechanism from a motor (all not shown) in a similar manner to that disclosed in Johnson Patent No. 2,386,066, granted January 23, 1945. Since the drive, as well as the mechanism for operating the clutch and brake of the sewing machine, form no part of the present invention, further showing and description thereof are deemed unnecessary and are omitted.

The machine selected for purposes of illustration is provided with a duel upper presser foot designated generally 26 which coacts with another upper feed foot 28 and a lower feed foot or dog 30 to engage, displace and feed, as well as retain the work of material M being stitched in proper position on a work support table or plate 32.

The actuating mechanism for effecting the vertical up and down motions of the pressed foot 26 and the upper feed foot 28 by means of vertical shafts 34 and 36, respectively, to which they are attached in the sewing head H is generally the same in construction and operation as that shown and described in Johnson Patent 2,386,800, and, therefore, a detailed description is deemed unnecessary to an understanding of the invention.

In order to insert new work and also to enable the operator to inspect the work at any time during the operation of the machine, presser foot 26 and feed foot 28 are so constructed and arranged that they may be lifted upwardly whenever the operator desires. This operation is accomplished by means of a knee actuated treadle or plate mechanism (not shown) similar to that shown in the above referred to Patent 2,386,800.

Lower feed foot 30 is so constructed that it may be moved transversely, as well as longitudinally, up and down. Thus the work may be given straight forward and backward feeding movement over the work table 32, and also transverse movement thereon, or a combined transverse and longitudinal movement. By virtue of these movements, it is possible to form highly complex stitches, such as the cross stitch shown in FIGURE 15. Furthermore, because of the novel construction and operation of the mechanisms embodying the invention, all stitches formed so closely resemble "hand" stitching that it is practically impossible to distinguish the final stitched product from actual hand stitching.

Figure 1:
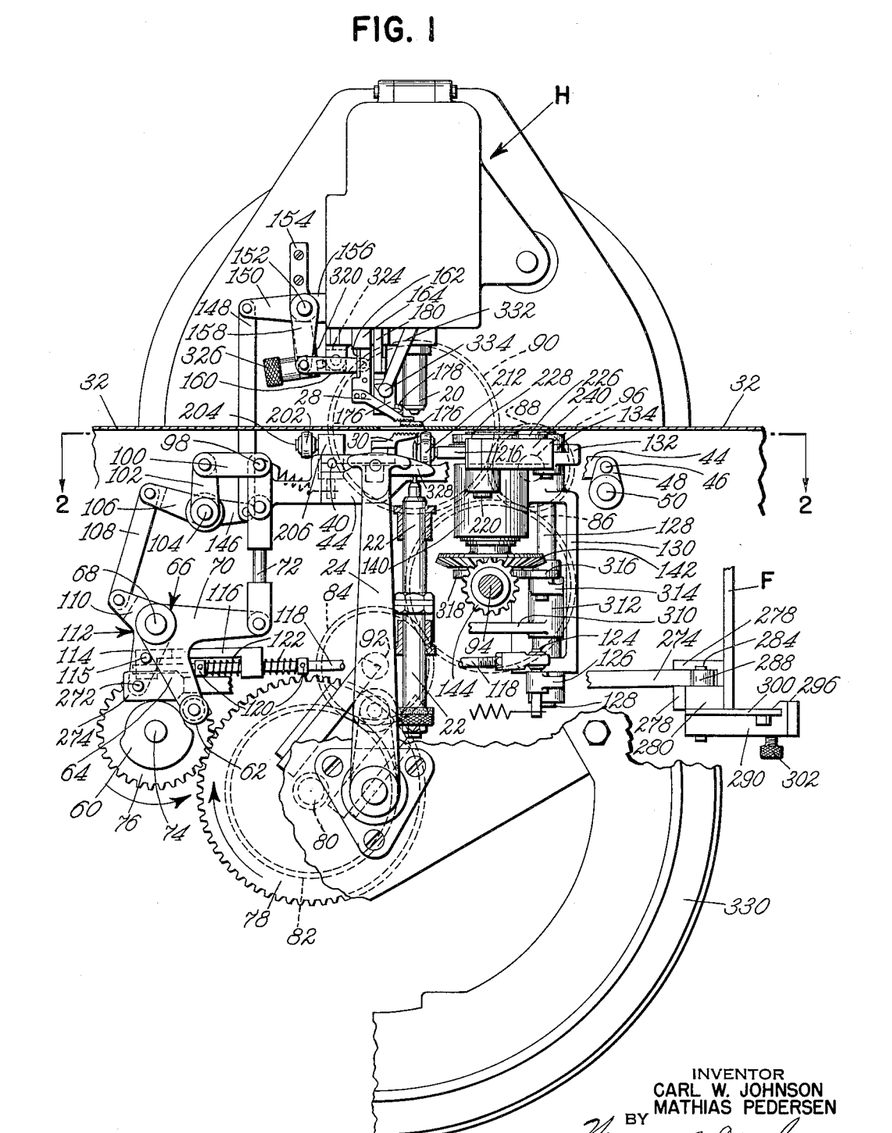
FIG. 1 is a partial sectional end elevation of a sewing machine illustrating a preferred embodiment of the invention.
Figure 3:
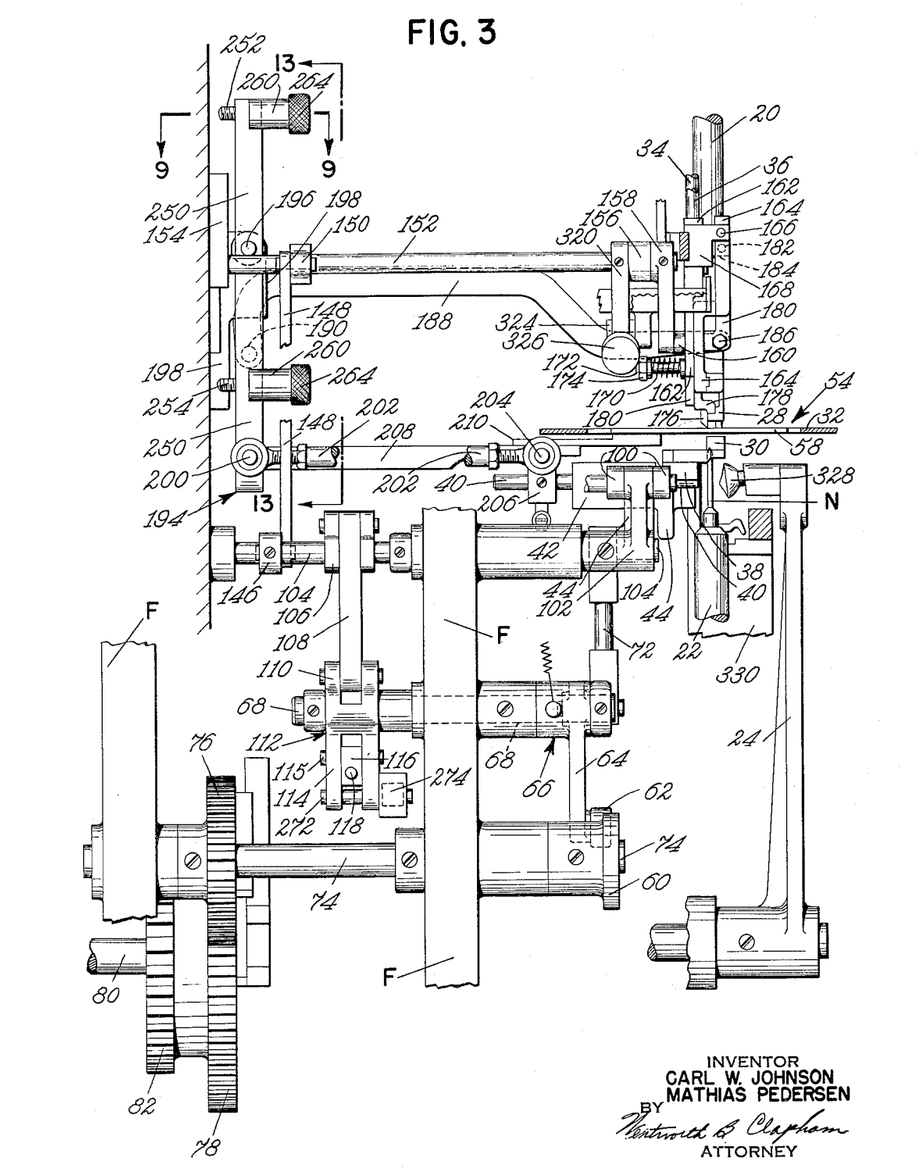
FIG. 3 is a view illustrating the lateral material feed and transverse displacement mechanism as seen from the rear of the machine.
Figures 12, 13, 14, 15:
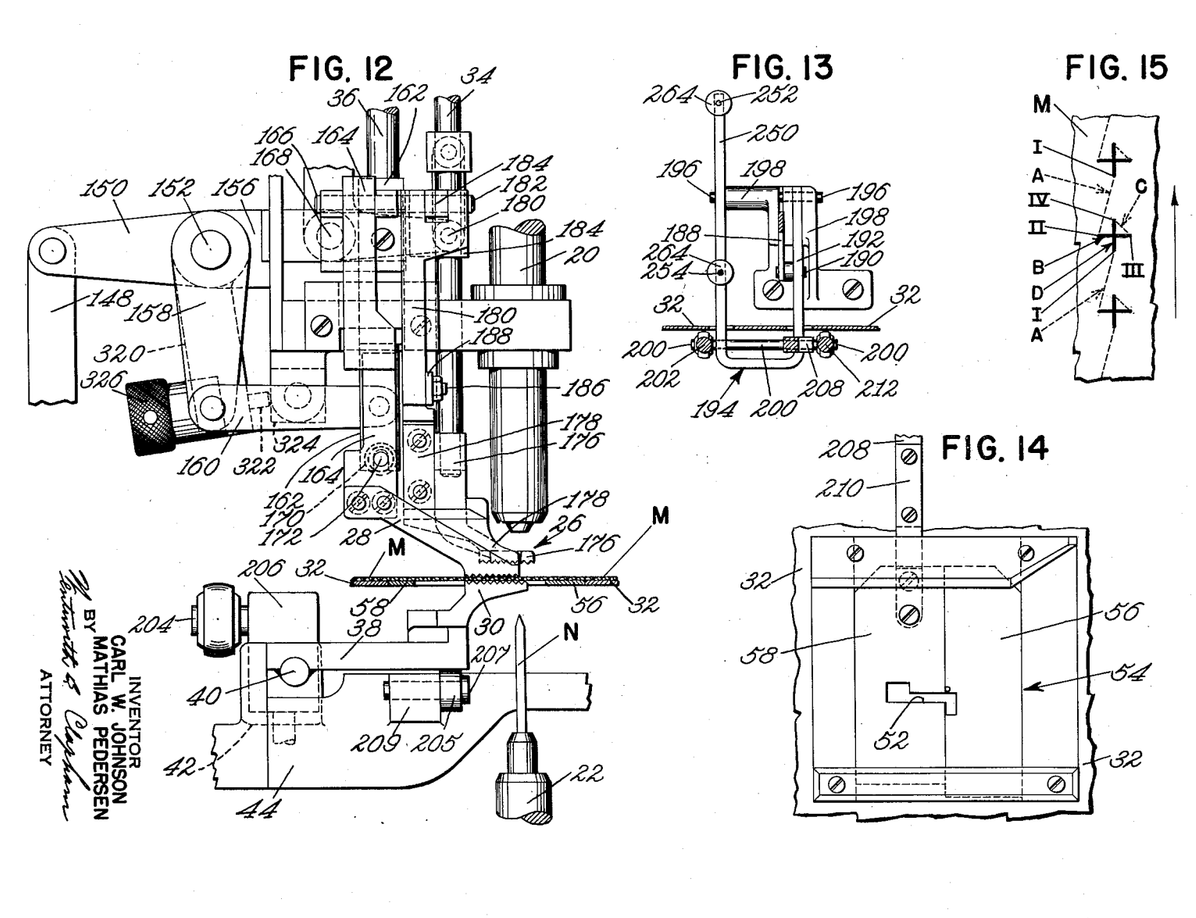
FIG. 12 is an enlarged end elevation of a preferred embodiment of the material engaging and feed mechanism.
FIG. 13 is a sectional side elevation taken on line 13—13 of FIG. 3.
FIG. 14 is a plan view of the movable and coacting throat plate of the machine.
FIG. 15 is a schematic illustration of one form of stitch which may be designated a cross stitch, produced by the machine embodying the invention.

Referring to FIGURES 1, 3 and 12, it will be seen that lower feed foot 30 is attached to a carrier bar 38 to which is rigidly attached, as by welding or other suitable means, a rod 40 laterally slidably mounted in a suitable bore of a laterally projecting lug or boss 42 of an arm 44. The extreme right end of arm 44, as illustrated in FIGURE 1, is pivotally attached to a stud 46 carried by a lever 48 loosely mounted on a stud shaft 50 suitably supported in the frame of the machine.

Lower feed foot 30 is provided with a corrugated or toothed work engaging and feeding surface adapted to engage and advance the work into and out of the path of travel of needle N. Lower feed foot 30 is moved in a closed path of travel upwardly through a slot 52 in throat plate 54 mounted in work table 32 with its upper surface lying in the plane of table 32. As illustrated in FIGURE 14, throat plate 54 consists of a stationary portion 56 and a slidable portion 58 arranged for transverse or lateral movement relative to the straight line movement of work M into and out of the path of travel of needle N.

During stitching operations, lower feed foot 30 carried by arm 44 and actuated by means described hereinafter, descends slightly below the level of throat plate 54 when disengaging its toothed feeding surface from the work M during its return stroke and then moves upwardly again to engage the work for the next feeding operation.

The upward and downward movements of lower feed foot 30 on arm 44 are effected by cam 60 which is tracked by a cam follower 62 on one arm 64 of bell crank lever 66 loosely mounted on stud shaft 68 held by and secured to the frame of the machine. The other arm 70 of bell crank lever 66 is pivotally connected to one end of a connecting rod 72. The other end of rod 72 is pivotally attached to the left end of the arm 44 as viewed in FIGURE 1. Cam 60 is mounted on and rotated continuously by shaft 74 supported in suitable bearings in the frame of the machine. Also secured to shaft 74 is a gear 76 which meshes with and is driven by gear 78 mounted on shaft 80. Gear 78 is integral with another gear 82 meshing with gear 84 which in turn meshes with and is driven by gear 86. Gear 86 meshes with gear 88 which meshes with and is driven by gear 90 secured to the belt driven pulley (not shown) which forms part of the driving mechanism illustrated and described in Patent No. 2,368,066 referred to hereinabove. Gears 84, 86 and 88 are mounted on shafts 92, 94 and 96, respectively, all of which are supported in suitable bearings in frame F of the machine.

Figure 2:
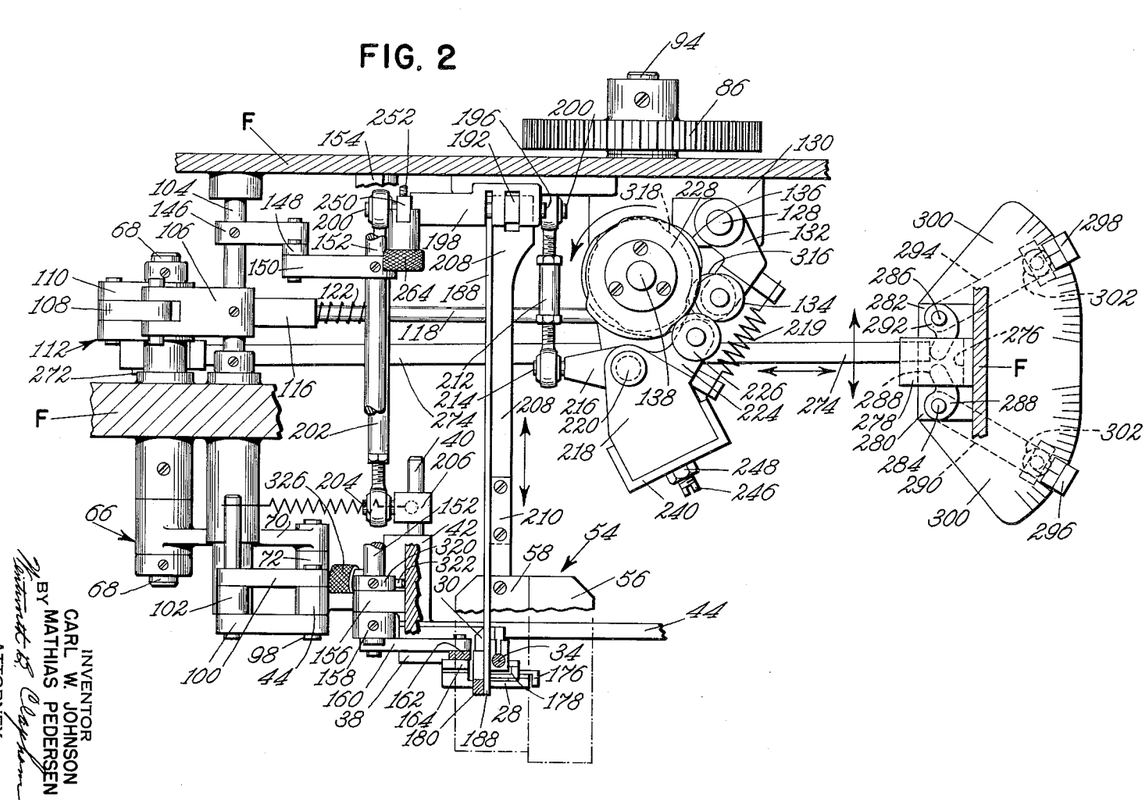
FIG. 2 is a sectional plan view taken on line 2—2 of FIG. 1.
Figures 4, 5, 6, 7, 8, 9, 10, 11:
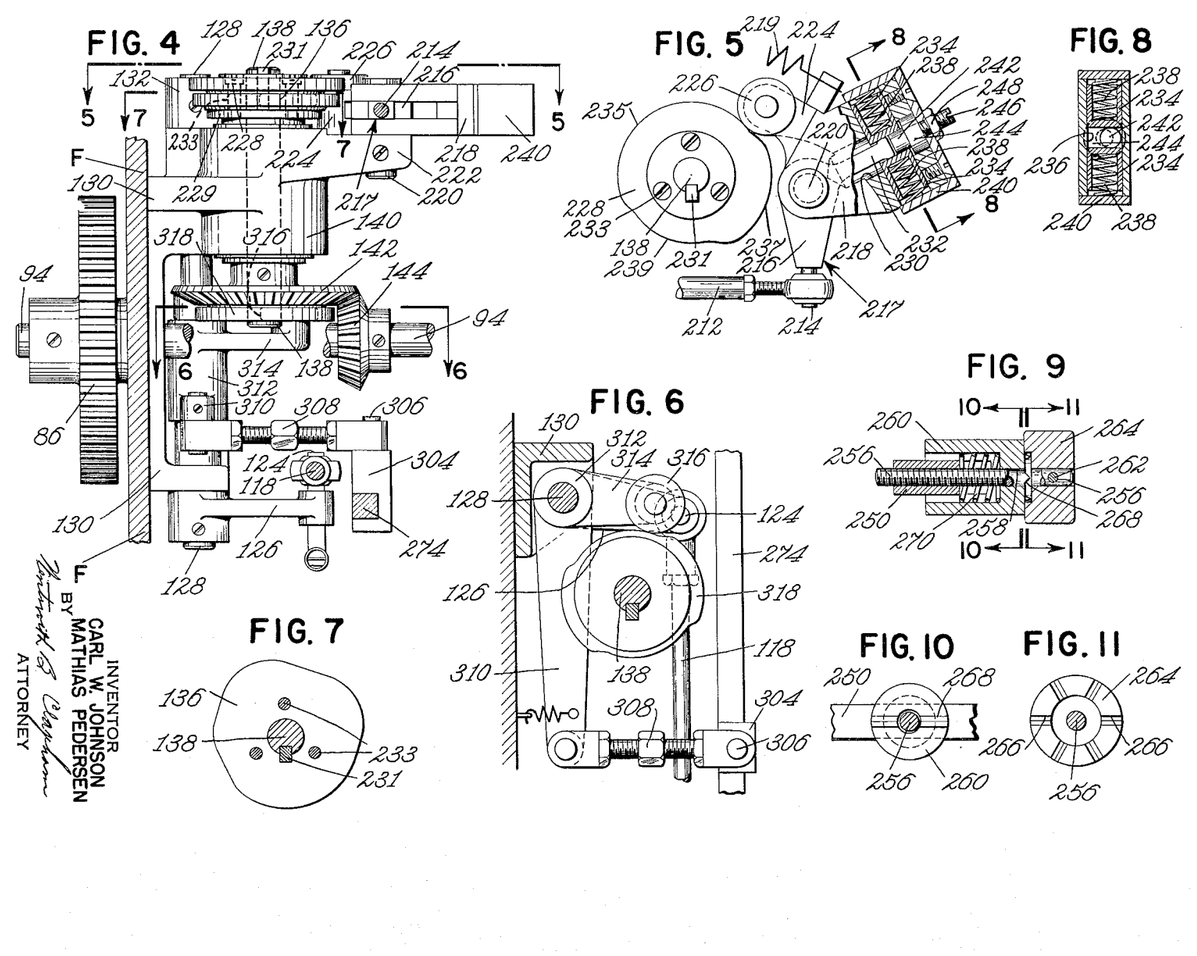
FIG. 4 is a side elevation of the actuating cam mechanism of the machine.
FIG. 5 is a partial plan view taken on line 5—5 of FIG. 4.
FIG. 6 is a sectional plan view taken on line 6—6 of FIG. 4.
FIG. 7 is a plan view of the material feed cam, taken one line 7—7 of FIG. 4.
FIG. 8 is a sectional end elevation of one of the transverse displacement adjusting mechanisms, taken on line 8—8 of FIG. 5.
FIG. 9 is a sectional plan view of the transverse displacement setting and control mechanism, taken on line 9—9 of FIG. 3.
FIG. 10 is a sectional end elevation taken on line 10—10 of FIG. 9.
FIG. 11 is a sectional end elevation taken on line 11—11 of 9.

Referring to FIGURES 1, 2 and 3, arm 44 carries a pin or stud 98 connected by means of a pair of parallel links 100 to the free end of arm 102 secured to shaft 104 rotatably supported by suitable bearings in the frame F of the machine. Secured to shaft 104 is another arm 106 connected by link 108 to one arm 110 of bell crank lever 112 loosely supported by stud shaft 68. Pivotally connected to the other arm 114 of bell crank lever 112 by stud 115 is one end of a U-shaped lug or bar 116. The other end of bar 116 is formed with a bore in which slidingly engages one end of a connecting rod 118. This end of rod 118 carries a pair of spaced collars 120 and a pair of encircling tension springs 122 and 123. Spring 123 is confined between one collar and the outer face of the lug 116; spring 122 is confined between the other collar and the inner face of U-shaped lug 116, thus effecting a firm but yieldable connection of bar 116 on arm 114 and connecting rod 118. The other end of connecting rod 118 (FIGURES 1, 4 and 6) is pivotally attached by stud 124 to arm 126 secured to the lower end of a vertical shaft 128 rotatably supported in suitable bearings in bracket 130 secured to machine frame F. A cam lever 132 is mounted on the upper end of vertical shaft 128 (FIGURES 2 and 4). It carries a cam follower 134 (FIGURE 2) running on cam 136 (FIGURE 7) mounted on vertical cam shaft 138 rotatably supported in a suitable bearing 140 integral with bracket 130. Vertical cam shaft 138 is continuously driven by means of bevel gear 142 mounted thereon and meshing with bevel gear 144 secured on shaft 94. This shaft, as described hereinabove, is rotated by gear 86 mounted thereon. Therefore, with the drive and connections thus described cam 136 effects the forward and backward movements of the lower feed foot 30 while cam 60 controls its up and down motions.

It is essential that upper feed foot 28 move and operate in synchronism with lower feed foot 30. The forward and backward movements of upper feed foot 28 are effected by an arm 146 secured to oscillating shaft 104

(FIGURES 1, 2 and 3), which is the same shaft that transmits forward and backward motion to lower feed foot 30. The free end of arm 146 is connected by link 148 to arm 150 mounted on horizontal shaft 152 supported by a pair of suitable bearing brackets 154 and 156 on frame F of the machine. Secured to one end of shaft 152 is a lever arm 158, the lower free end of which is pivotally connected by link 160 to feed foot actuating lug 162 secured to the lower end of vertical shaft 36, which effects the up and down movement of upper feed foot 28 in substantially the same manner as shown and described in Johnson Patent 2,386,800. Upper feed foot 28 itself is secured to the lower free end of a suitably shaped feed foot supporting arm 164 (FIGURE 12), the upper end of which is pivotally mounted on a stud shaft 166 held by suitable lugs 168 integral with and projecting from the upper portion of feed foot actuating lug 162 on shaft 36. Feed foot supporting arm 164 is laterally yieldingly connected to the lower end of the feed foot actuating lug 162 by means of a tension spring 170 which surrounds and is carried by a stud 172 held by and projecting from supporting arm 164 through the forked bottom end of actuating lug 162. The tension spring 170 is confined between the side of the latter and an adjustable nut 174 mounted on the free end of stud 172. This laterally yielding connection is substantially the same as that shown and described in co-pending application, Ser No. 571,731.

As mentioned hereinabove, stitching head H is provided with vertical reciprocatory shafts 34 and 36 which are responsible for the upward and downward movements of dual presser foot 26 and upper feed foot 28, respectively, to and from operative positions relative to work M on table 32. The construction and operation of shafts 34 and 36 are similar to those disclosed in Patent 2,386,800. The dual presser foot 26 comprises a foot 176 fixed to the lower end of vertical shaft 34, and a foot 178 secured to the lower free end of a suitably shaped arm 180. Arm 180, as shown in FIGURES 3 and 12, is provided with a forked head end pivotally mounted on a stud 182 held by a lug 184 secured to vertical shaft 34. Arm 180 also carries a stud 186 to which is pivotally connected one end of a suitably shaped link 188. The other end of link 188 (FIGURES 3 and 13) is pivotally connected by stud 190 to leg 192 of U-shaped lever arm 194 pivotally mounted on stud 196 held by a bracket 198 secured to frame F of the machine. The lower portion of U-shaped lever arm 194 carries a shaft or rod 200 to one end of which is pivotally connected one end of a connecting rod 202. The other end of rod 202 is pivotally attached to a stud 204 projecting from and held by a lug or block 206 rigidly secured to rod 40 of the lower feed foot carrier bar 38 (FIGURES 2 and 3). To facilitate the transverse movement of carrier bar 38 and to provide stability as well as support for lower feed foot 30 during material engaging operations, the lower free end of carrier bar 38 is supported by roller 205 pivotally mounted on a stud 207 held by a lug 209 which forms a part of arm 44.

Also pivotally connected to rod 200 is the forked end of a link 208 which straddles leg 192 of U-shaped lever arm 194. The other end of link 208 is connected to a suitable lug or bar 210 attached to the underside of the laterally slidable portion 58 of throat plate 54 (FIGURES 2, 3 and 14). Also pivotally connected to rod 200 is one end of a connecting rod 212, the other end of which is pivotally attached to stud 214 projecting from the free end of arm 216 of bell crank lever 217 protruding from a slotted housing 218 and pivotally mounted on vertical stud 220 held in a suitable flange 222 projecting from bracket 120 on frame F. Housing 218 is loosely swingably mounted on stud 220 and is provided with a lug 224 (FIGURES 2 and 5) in the free end of which is mounted a cam roller 226 engaging cam 228 on vertical cam shaft 138.

Housing 218 is provided with a centrally located chamber or bore 230 into which extends the free end of an arm 232 which, together with arm 216, forms the bell crank lever pivoted on stud 220, as mentioned above. Each side of the free end of arm 232 is contacted by a spring loaded piston 234 slidably mounted in a transverse bore 236. Pistons 234 oppose each other. Their tension springs 238 are confined between the bottom of their respective pistons and a suitable cover plate 240 secured to housing 218 (FIGURES 5 and 8). The contact of the spring loaded piston 234 with bell crank actuating arm 232 effects a firm but yieldable connection between cam roller lug 224 and the bell crank actuating lever formed by arms 232 and 216 which through rod 212, U-shaped lever arm 194 and the other linkage described above and connected therewith, transmit transverse horizontal motion to movable portion 58 of throat plate 54, the lower feed foot 30 and presser foot 178, which in turn by sideward engagement transmits its transverse movement to the upper feed foot 28 in the same general manner as illustrated and described in Johnson co-pending application, Ser. No. 571,731.

In order to provide means for accurately adjusting the longitudinal portion of a cross stitch relative to the transverse portion thereof when making a cross stitch, housing 218 is provided with an eccentric stud 242 (FIGURES 5 and 8), the diameter of which may be substantially the same as the width of the arm 232 of the bell crank lever. Stud 242 projects into the space between the bottoms of the two opposed spring loaded pistons 234, as illustrated in FIGURES 5 and 8. Eccentric stud 242 preferably is formed integrally with a disc or flange 244 provided with a concentric slotted stud 246 which extends through cover plate 240 to the exterior of housing 218. Turning of the slotted stud 246 by means of a screw driver, turns the eccentrically mounted stud on disc 244 which moves spring loaded pistons 234 either to the right side or left side, depending on the direction in which stud 246 is turned. Since spring loaded pistons 234 engage the free end of arm 232 of the bell crank actuating lever 217 and cam roller is kept in contact with cam 228 by tension spring 219, any shift of pistons 234 effects a change in position of arm 232 in a clockwise or counter-clockwise direction. Also, any change in the position of arm 232 will, through arm 216 and the aforementioned connections and linkages, effect a change in the transverse position of the material engaging means, namely the movable throat plate 58, the lower feed foot 30, the upper presser foot 178, and upper feed foot 28. The cam 228 is so designed that during longitudinal stitching the roller 226 engages with the medium high portion 235 of said cam and no transverse displacement of material M takes place. However, when the roller 226 drops from the high portion 237 to the low portion 239 of said cam, material M is displaced transversely the maximum distance possible which of course occurs during transverse stitching. Since the distance betwen the medium high portion 235 and the high portion 237 of the cam is the same as the distance between said medium high portion and the low portion 239, the longitudinal stitch is always substantially in the center of the transverse stitch and a perfect cross stitch may result. However, due to a certain amount of play in the linkages and connection between the bell crank actuating lever 217 and the material displacement means, a more accurate centering of the longitudinal stitch in relation to the transverse stitch may be obtained by rotating or turning the eccentric stud 246 in a clockwise or anti-clockwise direction. The slotted adjusting stud 246 is threaded and provided with a lock nut 248 (FIGURE 5) which may be loosened while making the desired setting and locked after the setting is completed.

In order to be able to adjust the length of the transverse stitch and also to provide means for forming an off center cross stitch as well as a T or an L stitch, leg 250 of the U-shaped lever arm 194 carries two spring loaded adjustable stop screws 252 and 254 (FIGURES 3 and 13). Screw 252 is mounted above pivot 196 of lever arm 194 and is employed to control the starting point of the transverse stitch. Screw 254 is mounted below pivot 196 and is employed to control the end of the transverse stitch. The transverse stitch cam 228 through roller 226 moves housing 218 through an arc of equal distance during each cycle. However, when arm 232 of the bell crank lever through the described linkages is arrested by either stop screw 252 or 254, the lost motion of housing 218 is taken up by the springs 238 in the pistons 234.

Each stop screw 252 and 254 consists of a stud 256 (FIGURE 9) threadably engaging a threaded bore in leg 250 of U-shaped lever arm 194. The inner end of threaded stud 256, as viewed in FIGURE 9, projects through a clearance hole 258 of a slotted cup shaped member 260 which straddles leg 250, as illustrated in FIGURES 9 and 10. Attached to the upper end of stud 256 by pin 262 is a suitable knurled knob 264 employed for the purpose of turning the stud 256 to make desired adjustments. The lower face of knob 264 is provided with a plurality of radially arranged V-shaped grooves 266 (FIGURES 11) which serve the purpose of engaging a ridge 268 provided on the top surface of cup shaped member 260 urged against the bottom face of knob 264 by means of spring 270 surrounding stud 256 and confined within cup shaped member 260 between the top edge of leg 250 and the inner bottom of cup shaped member 260 which thus serves as an efficient locking means for each stop screw.

In order to control and adjust the longitudinal work feeding movement of the upper and lower feed foot 28 and 30, respectively, arm 114 of bell crank lever 112 carries a stud 272 (FIGURES 1 and 3) to which is loosely pivotally attached one end of a switch length control bar 274. The other free end of bar 274 protrudes loosely into a horizontal slot 276 formed in a suitably shaped bracket 278 secured to the front portion of frame F of the machine (FIGURES 1 and 2). Bracket 278 is provided with two side flanges 280 and 282, respectively, each of which forms a bearing for loosely supported vertical shafts or studs 284 and 286, respectively. Mounted on the upper end of stud 284 is a suitably shaped stop lug 288. The lower end of the stud 284 carries an adjustable control arm 290. Mounted on the upper end of stud 286 is a suitably shaped stop lug 292. The lower end of stud 286 supports an adjustable control arm 294. Each control arm 290 and 294 is provided at its free end with a guide head 296 and 298, respectively. Both guide heads have suitable pointer marks and slidingly engage with the front edge of a graduated scale plate 300 suitably secured to the bottom of bracket 276 and extending outwardly from the front end of the machine. Each control arm is also provided with a suiable knurled lock screw 302 by means of which each arm may be locked in the desired adjusted position.

Stop lugs 288 and 292 are so spaced and arranged that their free ends or noses project into horizontal slot 276 of bracket 278 in the manner best illustrated in FIGURE 2 of the drawings. Integral with control bar 274 is a lug 304 (FIGURES 4 and 6) which carries a vertical stud 306 to which is pivotally attached one end of an adjustable connecting rod 308. The other end of rod 308 is pivotally secured to the free end of an arm 310 projecting from and preferably forming an integral part of hub 312 of cam lever 314 loosely mounted on vertical shaft 128, as shown in FIGURES 4 and 6.

Cam lever 314 carries cam roller 316 which engages with a stitch length selector cam 318 secured to vertical cam shaft 138. Cam 318 is so designed that through cam lever 314 and the other linkage described above, it effects a lateral oscillating motion or displacement of control bar 274 timed in such a manner that the free end thereof during its rearward stroke alternately contacts the stop lugs 288 and 292. Since each rearward stroke of bar 274 is caused by the forward feed motion during the formation of alternating top and bottom stitches, the length of the top and bottom stitches may be individually controlled by the manual setting of the stop lugs 288 and 292. This is accomplished by moving the control arm of the respective stop lug 288 or 292 to a selected operative position. In selecting a shorter top and/or bottom stitch, the lost motion of rod 118 is compensated for by springs 122 and 123, mentioned above. In order to provide adjustment and control for the positive backward feeding incident with the length of a backward stitch, horizontal shaft 152 which transmits backward feeding motion through lever arm 158 and link 160 to upper feed foot actuating lug 162, is provided with a control lever 320 (FIGURES 1, 3 and 12), the free end of which carries an adjustable stop screw 322 which contacts a suitable block 324 (FIGURES 3 and 5) suitably mounted on sewing head H. Stop screw 322 may be turned by a knob 326 which is identical in construction and coacts with the same type of slotted spring urged cup shaped member as that illustrated in FIGURES 9, 10 and 11 and described heretofore. After the position back feed motion is arrested, the lost motion of feed actuating rod 118 is again compensated for by springs 122 and 123.

The machine operates as follows, it being assumed that in the operation described hereinbelow, a series of cross stitches are being made in a piece of work or material M, such as illustrated in FIGURE 15. Needle N and a thread having a fixed and a loose end, are projected by upper needle bar 20 downwardly through work M, whereupon the lower needle bar 22 grips needle N at the point designated I in FIGURE 15. The material is then advanced longitudinally, and is also displaced transversely at the same time, and needle N and the thread are then projected upwardly by lower needle bar 22 through the work to the upper needle bar 20 at a point designated II in FIGURE 15. The actual path of the work M is indicated by the broken lines connecting points I and II. This completes the first bottom stitch designated A shown in broken lines in FIGURE 15.

In the next operation, material M is displaced transversely only and needle N and the thread are passed downwardly as the result of the movement of upper needle bar 20 through the work and into the lower needle bar 22 at a point designated III, which marks the completion of transverse stitch B. Material M is then moved rearwardly in a longitudinal direction and is displaced transversely at the same time, after which needle N and the thread are projected by lower needle bar 22 upwardly through the material M at the point designated IV, whereupon the needle N is gripped by upper needle bar 20 thus completing bottom stitch C shown in dotted lines in FIGURE 15. Material M is then advanced again in a straight line forward motion, after which needle N and the thread are projected downwardly through material M which marks the completion of stitch D as well as the cycle of operations necessary to produce a full cross stitch, as illustrated in FIGURE 15. During each cycle of operations of the machine, needle N is moved by the opposed alternately operating needle bars 20 and 22 back and forth relative to work support table 32, and projected through the work or material M with the thread, all in timed relation to the operation of the work feeding and holding means which comprise the upper and lower feed feet 28 and 30, and dual presser foot 26, as well as the transverse movement of movable throat plate 58.

While the description given directly above shows the manner in which cross stitches are formed, it will be obvious that by suitable adjustments, such for example as by turning adjusting screws 246, modified types of cross stitches can be made. So also L stitches or T stitches can be made depending upon the extent to which the transverse stitch portion of each composite stitch is located with respect to the longitudinal portion of each composite stitch.

On alternate operations of needle bars 20 and 22, and while a portion of the thread is held above the work M by a thread engaging and supporting head 334, referred to hereinabove, a loop of thread formed beneath work table 32 is engaged by a thread engaging head 328 carried by rotary thread puller 24. Thread puller 24 pulls the loose end of the thread over head 334, through work or material M and disposes it about the periphery of a thread receiving and supporting drum 330 (FIGURES 1 and 3) in such a manner that danger of snarling, spitting by the needle N, fouling or breakage of the thread is practically eliminated.

As shown in FIGURE 1, thread engaging and supporting head 334 is carried by the free end of an upper looper arm 332 swingably mounted in sewing head H. Head 334 is operative to engage a loop of thread formed above the material M on each downward movement of needle N by needle bar 20. Head 334 is provided with a roller (not shown) on which the thread is supported during the movement of looper arm 332 from left to right, as viewed in FIGURE 1, when on the next upward movement of the lower needle bar 22, thread engaging head 328 on thread puller arm 24 engages the loop of thread formed beneath the material and pulls the loose end of thread over the roller on head 334 and through the work in its operation of disposing the thread on drum 330. The construction and operation of the upper looper arm 332 is essentially the same as that disclosed in Patent 2,386,800 and further showing and description thereof are deemed unnecessary.

The machine can be adapted to make other types of stitches than the cross, L and T stitches referred to hereinabove. For this reason, cams 228 and 136 both can be removed, or only one or the other can be removed and replaced by one or two other cams of suitable configurations and designs in order to control the desired transverse and longitudinal displacements of the work relative to needle N. As shown in FIGURES 4, 5 and 7, cams 228 and 136 both slidingly engage a key 231 mounted in the upper end of vertical cam shaft 138, which is also provided with a suitable flange 229 to which both cams are secured by means of screws 233. The removal of cam 228 and/or 136 and their replacement with other selected cams can be effected readily by an operator simply by extracting screws 233 and lifting the cams off shaft 138, after which the new cams or cam may be placed in keyed relationship on shaft 138 and secured in operative position by screws 233.

The invention above described may be varied in construction within the scope of the claims, for the particular embodiments selected to illustrate the invention are but a few of the possible concrete forms which our invention may assume. The invention, therefore, is not to be restricted to the precise details of the structures shown and described.

What we claim is:

1. In a sewing machine of the class described, the combination with a pair of opposed alternately operating needle bars, a needle, a work support, work guide means adjustably mounted on said support, means for feeding work along said guide means on said work support, of means alternately connecting said needle with each bar for projection with a thread having a loose end through said work, a drum located adjacent said support, a thread puller movable about the periphery of said drum for pulling the free end of said thread through said work and disposing it about said drum, mechanism normally operative to feed said work along said guide means in a straight line path of movement, said mechanism including a feed dog located below said support, a work feeding foot coacting with said dog, and mechanism for adjusting the extent of movement of said feed dog and feed foot to vary the length of longitudinal stitches formed, said last-named mechanism comprising a cam, a cam lever having a cam follower engaging said cam, a link connected to said cam lever, a second lever, said link having a lost motion connection to said second lever, a control rod loosely connected to said second lever, a support for the free end of said control rod, stitch length controlling dogs located in the path of movement of and engageable by said free end of said control rod to limit the reciprocating movement thereof in response to the oscillations of said second lever to control the feeding movements of said feed dog and said feed foot.

2. A sewing machine in accordance with claim 1, wherein there are provided at least two laterally spaced adjusting dogs, means for adjusting the operative portions of said dogs, and means for moving the free end of said control rod laterally to engage said free end thereof alternately with a selected stitch length controlling dog.

3. In a sewing machine of the class described in combination with a pair of opposed alternately operating needle bars, a needle, a work support, means for feeding work along said work support past the path of movement of said needle, of means alternately connecting said needle with each bar for projection with a thread having a loose end through said work, a drum located adjacent said support, a thread puller movable about the periphery of said drum for pulling the free end of said thread through said work and disposing it about said drum, mechanism normally operative to feed said work to said needle along said support in a straight line path of movement, mechanism for moving said work laterally along said support relative to said normal path of travel, means for effecting the concurrent operation of both of said mechanisms to produce a diagonal movement of said work along said support relative to said needle whereby stitched components simulating hand stitching dispose substantially at right angles are formed in said work, a work support table over which said work is fed, a rear movable throat plate provided with a slot, a front fixed throat plate having a needle hole and also a slot opening toward said slot in said movable throat plate, said work feeding means including a feed dog located beneath said work support table having a work engaging surface movable upwardly through said solt into engagement with the undersurface of said work, said work displacing mechanism including means for moving said movable throat plate and said feed dog sidewise relative to a normal straight line movement of said work into and out of the range of operation of said needle.

4. The invention as defined in claim 3 wherein said mechanism for feeding said work includes a lower feed dog, an upper feed foot, a rocker arm, means pivotally mounting said rocker arm, links connecting said rocker arm to said feed dog, said feed foot and said movable throat plate, respectively, means for adjusting the extent of lateral movement of said dog, said foot and said movable plate, said means comprising adjusting devices mounted at opposite ends of said rocker arm, and means for securing each of said devices in a desired adjusted position.

5. The invention as defined in claim 3 wherein said mechanism for feeding said work includes an upper feed foot, a rocker arm, means pivotally mounting said rocker arm, links connecting said rocker arm to said feed dog and said feed foot, respectively, means for adjusting the extent of lateral movement of said dog, and said foot, said means comprising adjusting devices mounted at opposite ends of said rocker arm, and means for securing each of said devices in a desired adjusted position.

6. The invention as defined in claim 3 wherein said mechanism for feeding said work includes an upper feed foot, means for adjusting the extent of longitudinal movement of said feed dog and said feed foot to vary the length of over and under stitches formed, and mechanism for adjusting the operative position of said lower feed dog and said upper feed foot relative to the path of movement of said needle for selectively forming a continuous row of stitches on said straight line path of movement of said work past said needle or to either side thereof.

7. In a sewing machine, the combination with alternately operating opposed needle bars, of a double pointed needle having an eye formed between its points and a length of thread threaded through said eye, a work support surface, means for alternately connecting said needle with said bars for projection with said thread through work to be sewed, feeding means for normally moving said work along a normal straight line path of movement past the path of travel of said needle, for forming a continuous row of connected stitches, and mechanism including cam means operative in accordance with a desired stitching pattern for displacing said work diagonally out of said normal path of travel to a selected stitching position and for holding said displaced work at said position during the next movement of said needle through said displaced work, other cam means for moving said work substantially at right angles to said normal path of movement of said needle whereby said needle on its next path of travel forms a transverse stitch in said work, said feeding means including a dual presser foot and an upper feed foot, means for engaging said presser foot and said upper feed foot with the upper surface of said work, a work feeding dog operative to engage the under side of said work, and coact with said upper feed foot and said dual presser foot and move said work past said needle, means for moving said upper feed foot and said work feeding dog laterally to shift said work out of said normal path of movement of said work to said needle, and means for moving said upper feed foot and said feeding dog longitudinally rearwardly to travel said work rearwardly relative to the path of travel of said needle.

8. A sewing machine in accordance with claim 6, wherein said last-named mechanism includes a cam, a cam lever having a cam follower engaging said cam, said cam lever having an adjusting control arm, opposed resilient members engaging opposite sides of said arm, an adjusting device having an eccentric portion bearing against said members, means for rotating said device to adjust the operative position of said device relative to said opposed members, and means for securing said device in adjusted position.

9. A sewing machine in accordance with claim 7, including mechanism for adjusting the limits of movement of said last named means in accordance with a desired stitch pattern.

10. The invention defined in claim 7 including selective adjusting means for varying the movement of said feeding means in effecting the formation of transverse stitch components to one side or the other side of the straight line path of movement of the work to and from the path of travel of the needle, and mechanism for adjusting the longitudinal travel of said feeding means for varying the length and position of longitudinal stitch components located at right angles to said transverse stitch components in accordance with a predetermined stitching pattern.

References Cited in the file of this patent
UNITED STATES PATENTS

| | | |
|---|---|---|
| 2,386,800 | Johnson | Oct. 16, 1945 |
| 2,451,495 | Johnson et al. | Oct. 19, 1948 |
| 2,648,303 | Gerber | Aug. 11, 1953 |
| 2,682,845 | Robert et al. | July 6, 1954 |
| 2,755,754 | Urscheler | July 24, 1956 |